US010733166B1

(12) United States Patent
Pratt (10) Patent No.: US 10,733,166 B1
(45) Date of Patent: Aug. 4, 2020

(54) NESTED ICOSAHEDRAL GRID

(71) Applicant: Patricia D. Pratt, Redondo Beach, CA (US)

(72) Inventor: Patricia D. Pratt, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 469 days.

(21) Appl. No.: 15/585,479

(22) Filed: May 3, 2017

(51) Int. Cl.
*G06F 16/16* (2019.01)
*G06F 16/22* (2019.01)
*G06F 16/26* (2019.01)
*G06F 16/2455* (2019.01)

(52) U.S. Cl.
CPC .... *G06F 16/2264* (2019.01); *G06F 16/24554* (2019.01); *G06F 16/26* (2019.01)

(58) Field of Classification Search
None
See application file for complete search history.

(56) References Cited

U.S. PATENT DOCUMENTS

| | | |
|---|---|---|
| 83,411,111 | 11/1968 | Meyers, Jr. |
| 4,792,319 A | 12/1988 | Svagerko |
| 5,001,634 A | 3/1991 | Nordin |
| 5,377,166 A | 12/1994 | Kuhn |
| 6,750,864 B1 | 6/2004 | Anwar |
| 7,034,826 B1 | 4/2006 | Bronder |
| 7,408,554 B2 | 8/2008 | Lawson, Jr. et al. |
| 8,274,506 B1 | 9/2012 | Rees |
| 2002/0002807 A1 | 1/2002 | Newland |
| 2011/0175905 A1 | 7/2011 | Hao |
| 2015/0073961 A1* | 3/2015 | Cristoforo ........... G06F 3/04815 705/37 |
| 2015/0169758 A1 | 6/2015 | Assom et al. |

FOREIGN PATENT DOCUMENTS

WO 2002095622 A2 11/2002

OTHER PUBLICATIONS

Purser et al. A standardized procedure for the derivation of smooth and partially overset grids on the sphere, associated with polyhedra that admit regular griddings of their surfaces; Mathematical principles of classification and construction. NOAA. Dec. 2011. (Year: 2011).*
Wang, Ning Geometric Properties of the Icosahedral-Hexagonal Grid on the Two-Sphere. Oct. 2011. Society for INdustrial and Applied Mathematics. pp. 2536-2559.*
United States Office Action corresponding to U.S. Appl. No. 15/484,868 dated Mar. 21, 2019.
Rohrer et al., "The Shape of Shakespeare: Visualizing Text using Implicit Surfaces", 1998, Proceedings IEEE Symposium on Information Visualization (Cat. No. 98TB100258) (Year: 1998)
Final Office Action for U.S. Appl. No. 15/484,868 dated Sep. 27, 2019.

* cited by examiner

*Primary Examiner* — Tuankhanh D Phan
(74) *Attorney, Agent, or Firm* — Tarolli, Sundheim, Covell & Tummino LLP (57) ABSTRACT

A mesh engine can generate a nested icosahedral grid that maps data points of a plurality of data sets onto partitions on the nested icosahedral grid. The nested icosahedral grid can include an outer icosahedral grid with a first set of partition and an inner icosahedral grid with a second set of partitions. A first partition of the first set of partitions can be linked to the inner icosahedral grid.

20 Claims, 8 Drawing Sheets

NESTED ICOSAHEDRAL GRID

TECHNICAL FIELD

The present disclosure relates to systems and methods for generating a nested icosahedral grid.

BACKGROUND

"Big data" is a term for data sets that are so large or complex that traditional data processing applications are inadequate. Challenges include analysis, capture, data curation, search, sharing, storage, transfer, visualization, querying and information privacy. The term "big data" often refers simply to the use of predictive analytics or certain other advanced methods to extract value from data, and seldom to a particular size of a data set. Accuracy in big data may lead to more confident decision making and better decisions can result in greater operational efficiency, cost reduction and reduced risk.

A geodesic grid is a global Earth reference that uses triangular tiles based on the subdivision of a polyhedron (usually an icosahedron, a twenty-sided polyhedron) to subdivide the surface of the Earth. Such a grid does not have a straightforward relationship to latitude and longitude, but may conform to criteria for a statistically valid discrete global grid. Primarily, the area and shape of the cells/partitions are generally similar, especially near the poles where many other spatial grids have singularities or heavy distortion.

SUMMARY

One example relates to a non-transitory machine readable medium having machine executable instructions. The machine executable instructions can include a mesh engine that generates a nested icosahedral grid that maps data points of a plurality of data sets onto partitions on the nested icosahedral grid. The nested icosahedral grid can include an outer icosahedral grid with a first set of partitions and an inner icosahedral grid with a second set of partitions A first partition of the first set of partitions can be linked to the inner icosahedral grid.

Another example relates to a computing device that can include a non-transitory machine readable memory for storing machine readable instructions. The computing device can also include a processing unit to access the memory and execute the machine readable instructions. The machine readable instructions can include a mesh data viewer that communicates with a mesh data server to access a mesh data structure that links a nested icosahedral grid to data points and provides a graphical user interface (GUI) for changing views of the nested icosahedral grid. The icosahedral grid can include an outer icosahedral grid with a first set of partitions and an inner icosahedral grid with a second set of partitions. A first partition of the first set of partitions can be linked to the inner icosahedral grid.

Yet another example relates to a non-transitory machine readable memory for storing machine readable instructions, the machine readable instructions including a mesh data viewer that communicates with a mesh data server to access a mesh data structure that links a nested icosahedral grid to data points and provides a GUI for changing views of the nested icosahedral grid. The icosahedral grid includes an outer icosahedral grid with a first set of partitions and an inner icosahedral grid with a second set of partitions. A first partition of the first set of partitions can be linked to the inner icosahedral grid.

DETAILED DESCRIPTION

This disclosure relates to a system and method for generating and viewing a nested icosahedral grid. The system can include a mesh engine that generates the nested icosahedral grid with a particular scale and an interface that provides user controls for mapping data items of a data set to partitions in the nested icosahedral grid. The system can also include a model generator that links data items to the partitions of the nested icosahedral grid and generates a mesh data structure.

The nested icosahedral grid includes an outer icosahedral grid with a set of outer partitions and an inner icosahedral grid with a set of inner partitions. Additionally, in some examples, multiple inner icosahedral grids can be included. A partition (or multiple partitions) of the outer partitions is linked to the inner icosahedral grid.

The system can also include a mesh data viewer that communicates with a mesh data server to access a mesh data structure that links a nested icosahedral grid to data points and provides a graphical user interface (GUI) for changing views of the nested icosahedral grid. The GUI also includes a data panel for outputting data mapped to selected partitions in the nested icosahedral grid.

Figure 1:
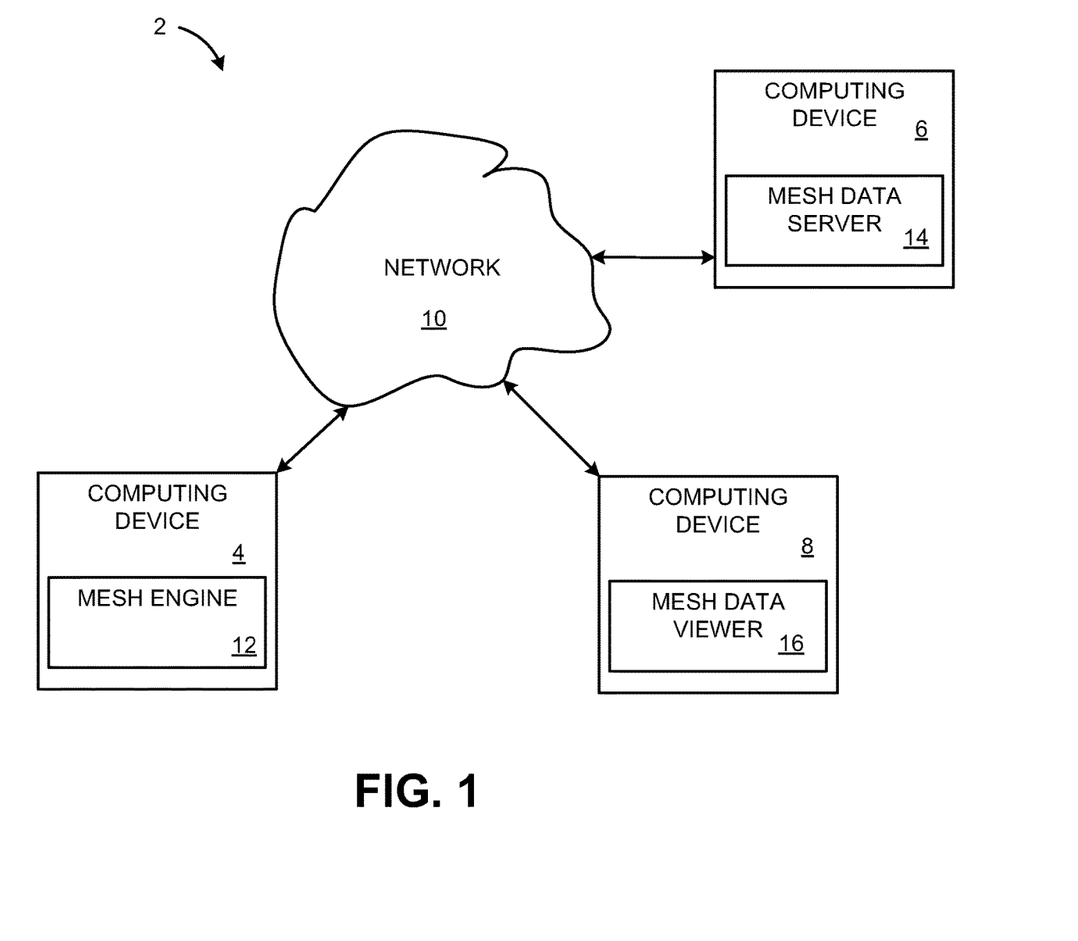
FIG. 1 illustrates an example of a system for generating and viewing a nested icosahedral grid.

FIG. 1 illustrates a system 2 for generating and viewing a nested icosahedral grid. The system 2 can include computing devices 4, 6 and 8 that communicate via a network 10. The network 10 may be a public network (e.g., the Internet), a private network (e.g., a local area network) or a combination thereof (e.g., a virtual private network).

Each computing device 4, 6 and 8 can be implemented as a general purpose computer having a non-transitory machine readable memory. The machine readable memory can be implemented as volatile memory (e.g., random access memory (RAM)), non-volatile memory (e.g., flash memory, a hard disk drive, a solid state drive, etc.) or a combination thereof. Additionally, each computing device 4, 6 and 8 can be implemented as a mobile computing device (e.g., a smartphone or tablet computer), a desktop computer, a laptop computer, a server blade, etc. Moreover, although the system 2 illustrates and describes the computing devices 4, 6 and 8 as performing different functions, in some examples, the functions can be integrated onto one computing device and/or distributed across multiple computing devices (e.g., in a computing cloud).

The computing device 4 can execute a mesh engine 12. The mesh engine 12 can be a computer application that provides a GUI for generating and editing a nested icosahedral grid. In particular, the GUI can provide an interface for mapping data parameters (e.g., data fields/variables) of a data set (or multiple data sets) onto partitions (cells) of the nested icosahedral grid. As used herein, the term "nested icosahedral grid" refers to a mesh grid data structure formed of at least two interconnected (linked) icosahedral grids. As one example, the nested icosahedral grid can include an outer icosahedral grid with a first set of partitions and an inner icosahedron grid with a second set of partitions. One (or more) of the partitions of the first set of partitions (on the outer icosahedral grid) is linked to the inner icosahedron grid.

The mesh engine 12 can retrieve the data from the data set based on the mapped data parameters and generate a mesh data structure (e.g., a computer file). The mesh data structure can be provided to a mesh data server 14 executing on the computing device 6 via the network 10.

The computing device 8 can include a mesh data viewer 16 that can communicate with the mesh data server 14 via the network 10. Alternatively, in some examples, the mesh data viewer 16 can be a front end (user interface) and the mesh data server 14 can be a back end (e.g., an engine) of an integrated computer application. The mesh data viewer 16 can communicate with the mesh data server 14 to allow a user to view and "fly through" a representation of the mesh data structure. The mesh data viewer 16 can include user controls for changing a translucency of one or more layers of the nested icosahedral grid and/or changing the view of the nested icosahedral grid from a three-dimensional view to two-dimensional, a cross-sectional view that allows concurrent viewing of multiple layers.

Additionally, the mesh data viewer 16 can allow the user to select (in response to user input) a partition of the icosahedral grid and output a data panel that outputs data values in data points corresponding to the selected partition. Moreover, the mesh data viewer 16 can allow selection of multiple partitions on different layers of the nested icosahedral grid. In this situation, the data panel can output data values for each selected partition concurrently, thereby allowing the user to compare and contrast the interrelationship of the data.

By employing the system 2, complex data sets (e.g., big data) can be efficiently organized and mapped onto the nested icosahedral grid. In this manner, the viewer (a user) can visualize and correlate data in ways that are not apparent using a conventional matrix and/or spreadsheet.

Figure 2:
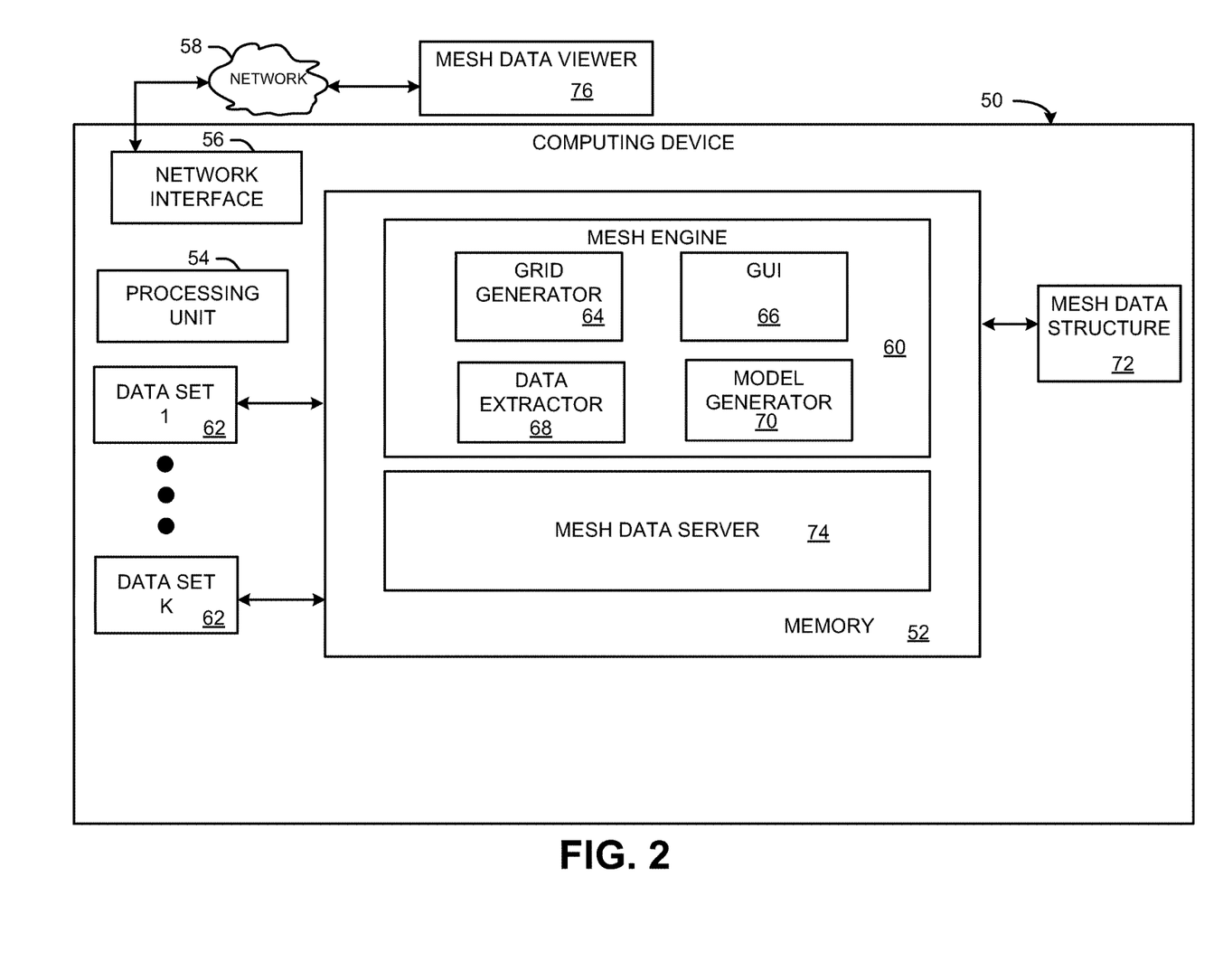
FIG. 2 illustrates an example of a computing device for generating a nested icosahedral grid.

FIG. 2 illustrates an example of a computing device 50 that can generate a mesh data structure. The mesh data structure can include, for example, a nested icosahedral mesh structure linked to data points. The computing device 50 can include a memory 52 that can store machine readable instructions. The memory 52 could be implemented, for example, as non-transitory computer readable media, such as volatile memory (e.g., random access memory), nonvolatile memory (e.g., a hard disk drive, a solid state drive, flash memory, etc.) or a combination thereof. The computing device 50 can also include a processing unit 54 to access the memory 52 and execute the machine-readable instructions. The processing unit 54 can include, for example, one or more processor cores. The computing device 50 can include a network interface 56 configured to communicate with a network 58. The network interface 56 could be implemented, for example, as a network interface card. The network 58 could be implemented for example, as a public network (e.g., the Internet), a private network (e.g., a carrier network) or a combination thereof.

The computing device 50 could be implemented, for example in a computing cloud. In such a situation, features of the computing device 50, such as the processing unit 54, the network interface 56, and the memory 52 could be representative of a single instance of hardware or multiple instances of hardware with applications executing across the multiple of instances (i.e., distributed) of hardware (e.g., computers, routers, memory, processors, or a combination thereof). Alternatively, the computing device 50 could be implemented on a single dedicated computing device.

The memory 52 can include a mesh engine 60. The mesh engine 60 can receive K number of data sets 62, where K is an integer greater than or equal to one. In some examples, each of the K number of data sets 62 (or some subset thereof) can be provided from an external device (e.g., a database or another computing device) via the network 58. In other examples, the K number of data sets 62 (or some subset thereof) can be generated locally (e.g., by a local database engine).

Each data set 62 can be implemented as a data structure (e.g., an array, a matrix, a linked list, a record, a graph, etc.) that represents an abstract data type (ADT). Each data set 62 set can represent, for example, data describing the physical or virtual world. In some examples, each of the K number of data sets 62 can represent a "big data" set. For instance, in the first example explained with respect to FIG. 2, a given data set 62 can represent temperature as a function of time measured at a specific region of the earth (or the entire earth). Additionally, another data set 62 can represent human population as a function of location. Still another data set 62 may represent measured Internet traffic as a function of time and location. In this manner, each data set 62 could be disparate from every other data set 62 in the K number of data sets 62. In other examples, two or more of the K number of data sets 62 may be related.

The mesh engine 60 can include a grid generator 64 that can generate a nested icosahedral grid that maps data from each of the K number of data sets 62 (or some subset thereof). To generate the nested icosahedral grid, an initial icosahedron (a twenty-sided polyhedron) can be generated inside a sphere such that two (2) opposing vertices (out of twelve (12) total vertices) of the icosahedron are aligned with specific opposing points on the sphere, namely, a given point and another point. In examples where the sphere represents the earth, the opposing points on the sphere could be the north and south poles of the earth.

Moreover, the grid generator 64 can connect five (5) of the remaining vertices of the icosahedron spaced at equal intervals of 72 degrees (corresponding to 360/5 degrees) at a circle (e.g., a latitude circle) that is located on the sphere about 26.656 degrees away (in a first tangential direction) from a circle halfway from the given point and the other point on the sphere. In examples where the sphere represents the earth, the circle can represent a latitude circle at 26.565 degrees North (° N). Additionally, the grid generator 64 can connect the five (5) remaining vertices of the icosahedron spaced at equal intervals of 72 degrees (corresponding to 360/5 degrees) at a circle on the sphere (e.g., a latitude circle) that is located about 26.656 degrees away (in a second tangential direction) from a circle halfway from the given point and the other point on the sphere. In examples where the sphere represents the earth, the circle can represent a latitude circle at 26.565 degrees South (° S).

Figure 3:
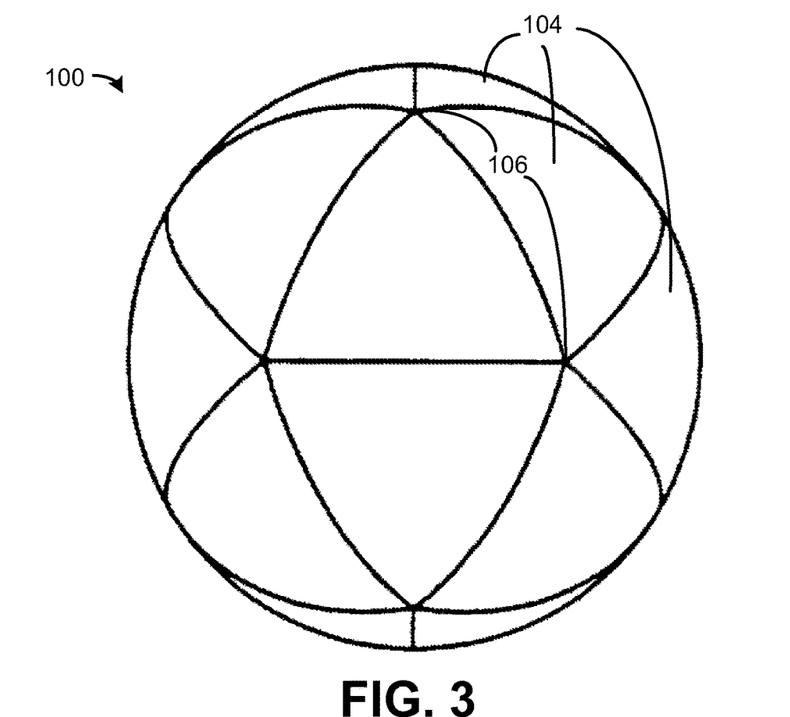
FIG. 3 illustrates an example of an icosahedral grid.

The grid generator 64 can connect nearest neighbors of the twelve (12) points on the sphere with circle arcs that divide the spherical surface into twenty (20) equal spherical triangles. FIG. 3 illustrates an example of an icosahedral grid 100 with twenty (20) equal spherical triangles 104. Additionally, the icosahedral grid 100 includes 12 nodes 106 (grid points) that correspond to vertices on the spherical triangles 104. For purposes of simplification of explanation, not all of the spherical triangles 104 or the nodes 106 are labeled in FIG. 3. The grid generator 64 can scale the icosahedral grid by iteratively connecting the midpoints of spherical triangles 104 with an additional set of arc circles until a desired resolution is obtained.

Referring back to FIG. 2, the mesh engine 60 can include a GUI 66 that can allow a user to view and edit the icosahedral grid 100 generated by the grid generator 64. In particular, the GUI 66 (in response to user input) can select a particular partition (e.g., the spherical triangle 104) and map parameters (e.g., data fields) from a data set 62 to the particular partition. In particular, the parameters of the data set 62 can be mapped to the edges (lines) the partition and/or to the area covered by the partition. Additionally, in some examples, the user can employ the GUI 66 to increase or decrease the scaling of the icosahedral grid 100. As one example, the GUI 66 can also (in response to user input) set each of the twenty (20) spherical triangles 102 to be combined with another adjacent spherical triangle 102 to form a spherical parallelogram (another form of partition). In this situation, the GUI 66 can allow a two-dimensional "unfolded" viewing of the scaled icosahedral grid.

Figure 4:
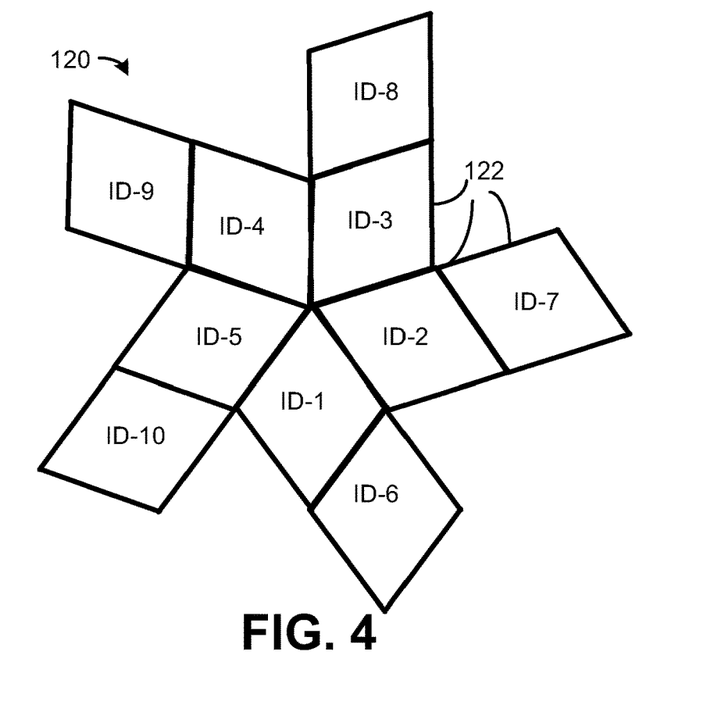
FIG. 4 illustrates an example of an icosahedral grid in a two-dimensional plane.

FIG. 4 illustrates a two-dimensional ("unfolded") icosahedral grid 120 where spherical triangles (102 of FIG. 3) have been combined to form parallelograms 122 (some of which are not labeled). Each parallelogram 122 includes a unique identifier (ID). Accordingly, in the example illustrated in FIG. 4, there are ten (10) IDs, namely ID-1 . . . ID-10. The user can employ the GUI 66 to map/assign data parameters (e.g., a data field or cell, such as a matrix cell or database record) from a given data set 62 to each of the parallelograms 122 (or some subset thereof). In some examples, the given data set 62 (e.g., a parent data set) can include pointers/references to other data sets 62 (e.g., child data sets). For example, the given data set 62 could represent offices of a multi-national organization, and different data cells of the given data set 62 are assigned to different parallelograms 122 based (for example) on a geolocation of each office. In this situation, assuming a particular data cell of the given data set 62 is assigned to the parallelogram 122 labeled as ID-1, the particular data cell could include references/pointers to lists of organizations and/or employees in different data sets 62. Alternatively, the particular data cell could be self-contained (e.g., containing no references).

Figure 5:
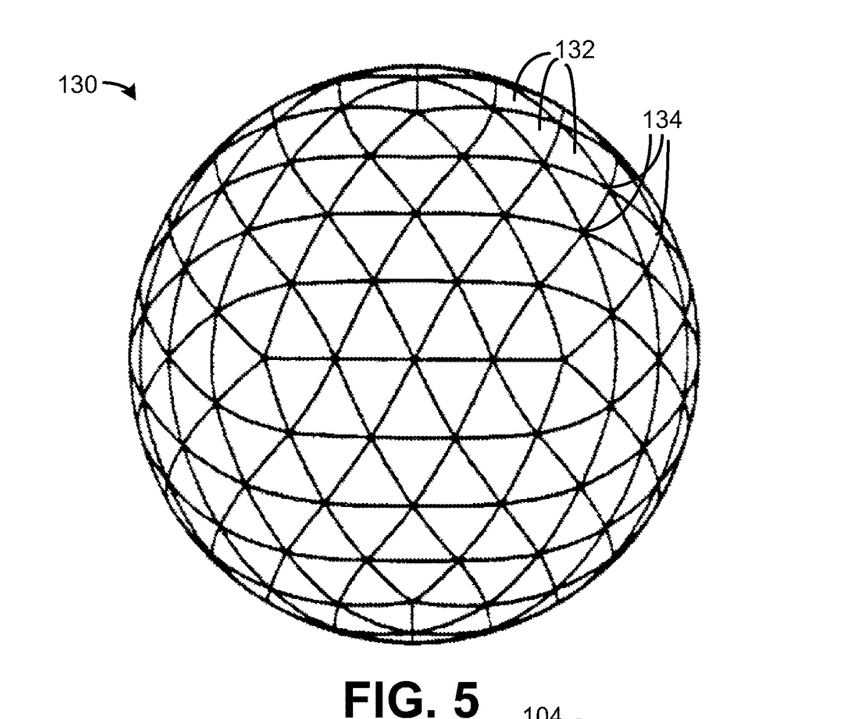
FIG. 5 illustrates another example of an icosahedral grid.

Additionally, instead of increasing the size of the partitions (as illustrated in FIG. 3), the user can employ the GUI 66 to reduce the size of the partitions. FIG. 5 illustrates an icosahedral grid 130 where the spherical triangles 104 of FIG. 3 have been iteratively divided four (4) times to form spherical triangles 132 connected by nodes 134 (grid points). In FIG. 5, (similarly to FIG. 3) not all of the spherical triangles 132 or the nodes 134 are labeled.

Referring back to FIG. 2, Equation 1 defines a number of spherical triangles of an icosahedral grid and Equation 2 defines a number of node (grid points) in the icosahedral grid in situations where the number of spherical triangles has been uniformly divided.

$$20n^2 = t \quad \text{Equation 1}$$

$$10n^2 + 2 = g \quad \text{Equation 2}$$

wherein:

n is the number of equal internals into which side of the undivided (original) spherical triangles (spherical triangles 104 of FIG. 2) are divided;

t is the number of spherical triangles in the icosahedral grid; and g is the number of nodes (grid points) in the icosahedral grid.

Thus, by Equations 1 and 2, the icosahedral grid 100 of FIG. 3 has 20 spherical triangles and 12 nodes, and the icosahedral grid 130 of FIG. 5 has 320 spherical triangles and 162 nodes (grid points). Thus, by employing the GUI 66, the user can achieve nearly any resolution needed for the generated icosahedral grid, which resolution can correspond for example, to a resolution of the given data set 62 that is to be mapped onto the icosahedral grid.

Figure 6:
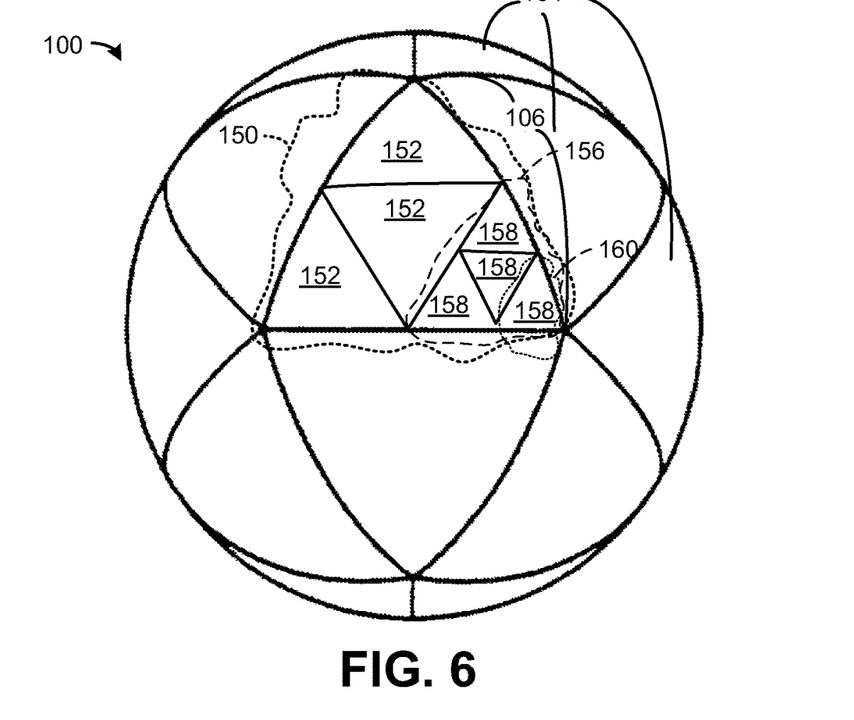
FIG. 6 illustrates yet another example of an icosahedral grid.

Moreover, the GUI 66 can include user controls (e.g., sliders, radio buttons, etc.) for varying a number of sub-partitions in each partition (e.g., a spherical triangle or a parallelogram). The user controls of the GUI 66 can allow the user to select a partition, and divide that partition into smaller units. For example, in FIG. 3, the user controls provided by the GUI 66 can allow the user to select a spherical triangle 104 (a partition) and divide the partition into four (4) sub-partitions, which can be represented as spherical triangles. FIG. 6 illustrates an example of the icosahedral grid 100 of FIG. 3 generated by the grid generator 64 wherein a given spherical triangle 150 is divided into four (4) sub-partitions 152, namely, four (4) spherical triangles. Additionally, one of the four (4) sub-partitions 156 is further sub-divided into four more sub-partitions 158.

Referring back to FIG. 2, in any configuration, the user can employ the GUI 66 to map/assign data cells from the given data set 62 (or multiple data sets 62) to each of the partitions, namely the spherical triangles 152 and 158. In some examples, the user can employ the GUI 66 to map parameters (data fields) of the given data set 62 to a surface of a partition (or sub-partition). Additionally or alternatively, the user can employ the GUI 66 to map parameters from the given data set 62 (or multiple data sets) onto lines interconnecting the partitions (e.g., spherical triangle edges or parallelogram edges).

Further still, the GUI 66 provides user controls for generating one or more additional icosahedral grids to form the nested icosahedral grid. For instance, in one example, the user can employ the user controls of the GUI 66 to link (map) a particular sub-partition (such as a spherical triangle 160 illustrated in FIG. 5) to another icosahedral grid generated by the grid generator 64. In one example, the other icosahedral grid can be nested inside the original icosahedral grid, which can be referred to (in this arrangement) as an outer layer icosahedral grid. Alternatively, the other icosahedral grid can be nested outside the original icosahedral grid, which can (in this arrangement) be referred to as an inner layer icosahedral grid. Additionally, the user can employ the GUI 66 to choose a scale and to map parameters from a data set 62 (or multiple data sets 62) onto the additional icosahedral grid in the similar manner as the outer layer icosahedral grid. Additionally, this process can be repeated for multiple icosahedral grid layers.

Figure 7:
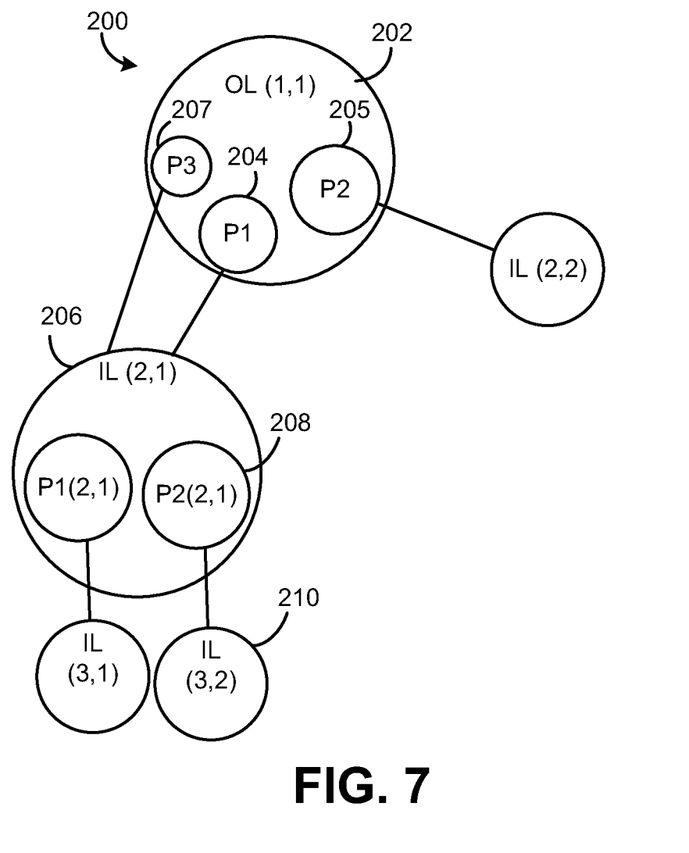
FIG. 7 illustrates a conceptual diagram of an example nested icosahedral grid.

FIG. 7 demonstrates a conceptual diagram 200 depicting a possible configuration of a nested icosahedral grid. Each icosahedral grid in the diagram 200 could be implemented in a manner similar to the icosahedral grid 100 or 120. Each icosahedral grid in the diagram 200 is labeled with an index number. The index number could represent, for example, a unique identifier of the icosahedral grid.

As an example, an outer layer icosahedral grid 202 is labeled as "OL (1,1)". In this case, the index number (noted in parentheses) denotes the layer and number of the icosahedral grid at the layer. Thus, the outer layer icosahedral grid 202 is the first icosahedral grid in the first layer. In other examples, different index number/addresses could be employed. Additionally, the icosahedral grid 202 includes three partitions 204, 205 and 207 (which could be, for example, spherical triangles or parallelograms). The first partition (labeled as "P1") 204 and the third partition (labeled as "P3") 207 can be connected (linked) to an inner layer icosahedral grid 206 (labeled as "IL (2,1)"). Accordingly, the inner layer icosahedral grid 206 has an index number of (2,1), which can indicate that the inner layer icosahedral grid 206 is the second layer and is the first icosahedral grid in the second layer. Similarly, the inner layer icosahedral grid 206 can include a partition 208 (e.g., a second partition) that is connected (linked) to a further (deeper) inner layer icosahedral grid 210 (labeled as "IL (3,2)"). The remaining icosahedral grids can be connected (linked) in a similar way. In this manner, the icosahedral grids of the nested icosahedral grid 200 can be arranged and layered to accommodate nearly any form of data set, whether or not the data sets 62 mapped to the icosahedral grids of the nested icosahedral grid 200 are correlated with each other.

Referring back to FIG. 2, the mesh engine 60 can also include a data extractor 68 that retrieves selected data cells from the K number of data sets 62 and links the retrieved data with the assigned position on the outer layer icosahedral grid and the inner layer icosahedral grids of the nested icosahedral grid. That is, the data extractor 68 can link data corresponding to a defined parameter on a partition of the nested icosahedral grid. In some examples, data extractor 72 can map pointers to specific data cells in the K number of data sets 62 to reduce data transfer. In other examples, values from the data cells in the K number of data sets 62 (selected for the outer layer icosahedral grid and the inner icosahedral grids) can be extracted and mapped to the outer layer icosahedral grid and the inner icosahedral grids.

Additionally, the mesh engine 60 can include a model generator 70 that plots representations of the extracted data on to the icosahedral grid to form a three-dimensional data model. In some examples, the data can be represented as color lines/regions and/or raised/retracted portions (e.g., a topographical map) in the three-dimensional data model. In some examples, the data extractor 68 can apply a smoothing function (e.g., a hexikes or similar function) to smooth seams between data points to provide estimated/extrapolated data between discrete data points in the extracted data. The model generator 70 can output a mesh data structure 72 that combines the three-dimensional data model and the extracted data. The mesh data structure 72 can be, for example, a computer file that links a three dimensional structure to data.

The mesh data structure 72 can be stored on a mesh data server 74. In some examples, the mesh data server 74 can be implemented as an external computing device. In other examples, the mesh data server 74 can be local to the computing device structure 72.

A mesh data viewer 76 can communicate with the mesh data server 74 to access the mesh data structure 72. In some examples, the mesh data viewer 72 can be a client application executing on a remote computing device, such as a desktop computer, a tablet computer a smartphone, etc. In this situation, the mesh data server 74 and the mesh data viewer 76 can communicate via the network 58. In other examples, the mesh data viewer 72 can be integrated with the mesh engine 60 of the computing device 50, and can access the mesh data structure 72 directly.

Figure 8:
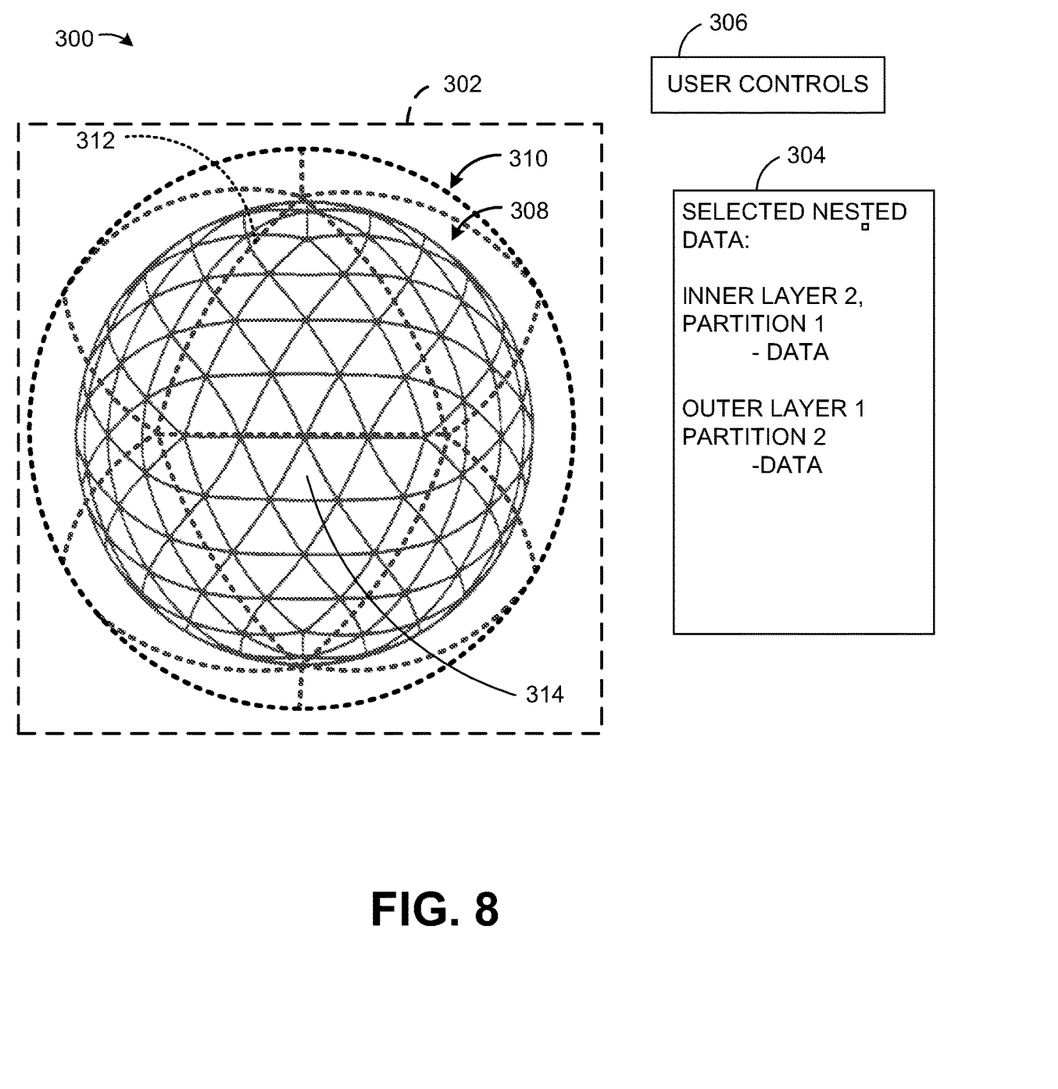
FIG. 8 illustrates an output of a graphical user interface (GUI) that includes a nested icosahedral grid.

FIG. 8 illustrates an example of a GUI output 300 (e.g., a screenshot or partial screenshot) of the mesh data viewer 72. The GUI output 300 includes a three-dimensional view of a nested (multi-layer) icosahedral grid 302 and a data panel 304. The GUI output 300 also includes user controls 306 (e.g., icons, sliders, radio buttons, etc.) for manipulating a view of the nested icosahedral grid 302.

The nested icosahedral grid 302 includes an inner layer icosahedral grid 308 that is circumscribed by an outer layer icosahedral grid 310. The user controls 306 can include options for controlling a translucency (opacity) of each layer in the nested icosahedral grid 302. In the example illustrated by the GUI output 300, the outer layer icosahedral grid 310 is set to a level of translucency that allows a user to directly observe the inner layer icosahedral grid 308. However, in some examples, the user controls 306 can also include controls that cause the outer layer icosahedral grid 310 to be hidden from view (intermittently).

The user of the mesh data viewer 72 can select (e.g., by clicking or pressing) a particular partition on the outer layer icosahedral grid 310 and revealing the inner layer icosahedral grid 308 associated with the particular partition. Additionally, the user can select a particular partition in the inner layer icosahedral grid 308 to reveal data in the data panel 304.

For example, in a situation where the user selects partition 2 of the outer layer icosahedral grid 310 (labeled as reference number 312) and partition 1 of the inner layer icosahedral grid 308 (labeled as reference number 314), the mesh data server 74 of FIG. 2, which communicates with the mesh data viewer 76, can execute a wavelet function on the mesh data structure to determine the data items (values) that are needed for the selected partitions 312 and 314. Execution of the wavelet function can reduce the amount of data that is transmitted through the network 58. Thus, in some examples, the mesh data server 74 can transmit the data items associated with the selected partitions 312 and 314, and data items that not relevant to the selected partitions are not transmitted to the mesh data viewer 76 to reduce transmission data over the network 58.

The data panel 304 can display the data received from the mesh data server 74. As illustrated, the data panel 304 outputs the data associated with partition 1 of inner layer icosahedral grid 308 and the data associated with partition 2 of the outer layer icosahedral grid 310.

In a given example, partitions on the outer layer icosahedral grid 310 could represent the recorded travels of a group of people (aggregated), and the inner layer icosahedral grid 308 could represent the recorded travels of a single person in the group of people. In this manner, the user can view the data panel 304 to draw correlations between data associated with the outer layer icosahedral grid 310 and data associated with the inner layer icosahedral grid 308 that would not be apparent from simply viewing the data in a conventional fashion (e.g., in a table).

Figure 9:
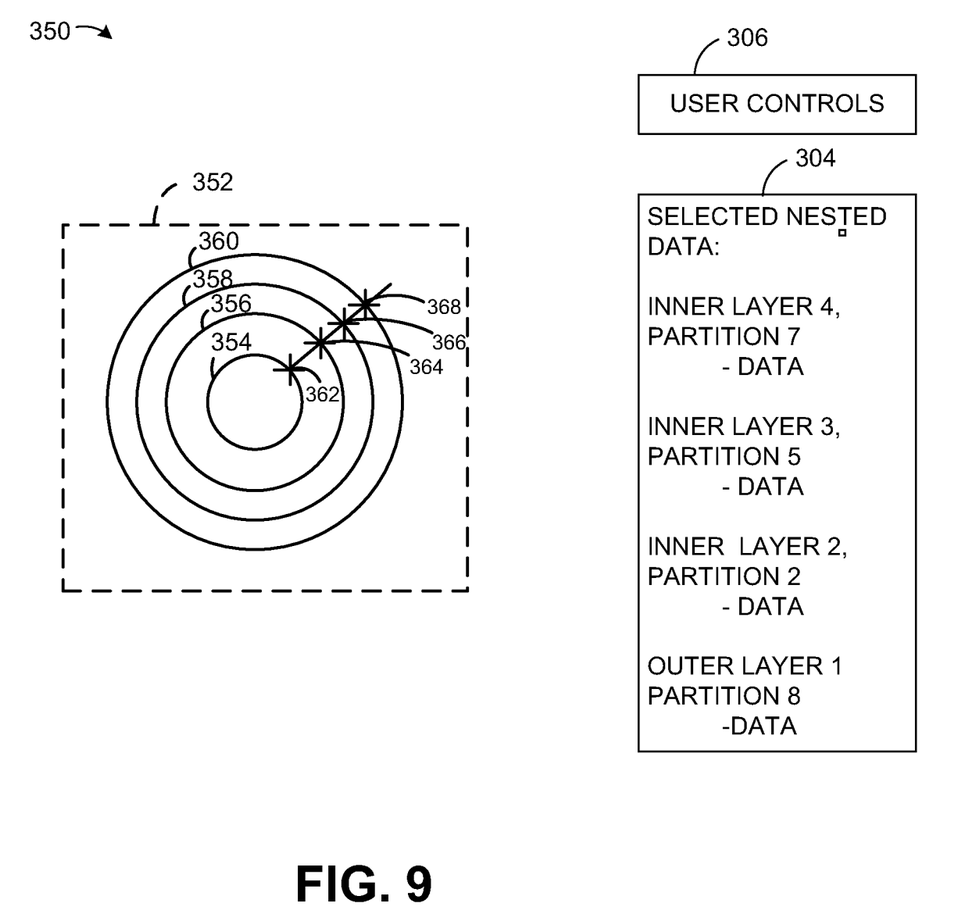
FIG. 9 illustrates an output of a GUI that includes a nested icosahedral grid.

FIG. 9 illustrates another example of a GUI output 350 (e.g., a screenshot or partial screenshot) by the mesh data viewer 76 of FIG. 2. For purposes of simplification of explanation, the same reference numbers are employed in FIGS. 8 and 9 to denote the same structure.

The GUI output 350 includes a nested icosahedral grid 352 that is arranged (e.g., by the user controls 306) to show a two-dimensional cross-sectional slice view (a relatively thin slice) of the nested icosahedral grid 352. In the example illustrated by the GUI output 350, the nested icosahedral grid 352 includes three (3) inner layer icosahedral grids 354, 356 and 358 and an outer layer icosahedral grid 360. In the cross-sectional view of the nest icosahedral grid 350, each layer is visible concurrently.

In the example illustrated, the user has selected the following: partition 7 of inner layer 4 (labeled as reference number 362), partition 5 of inner layer 3 (labeled as reference number 364), partition 2 of inner layer 2 (labeled as reference number 366) and partition 8 of outer layer 1 (labeled as 368). In response to the selection, the mesh data server 74 executes a wavelet function and returns data items associated with the selected partitions 362, 364, 366 and 368, which data items can be displayed in the data panel 304.

In another example, each of the icosahedron data grids 354, 356, 358 and 360 may represent network (Internet) usage associated with an IP address, wherein each IP address on each of the icosahedron data grids 354, 356, 358 and 360 is assigned to a partition. Moreover, each of the icosahedron data grids 354, 356, 358 and 360 may be assigned a different time. That is, in this example, each of the icosahedron data grids 354, 356, 358 and 360 have the same parameters (e.g., network traffic and IP addresses) for different instances in time. Thus, in this example, the data output in the data panel 304 could allow the user of the mesh data viewer 76 to observe how network traffic varies for a particular IP address over time.

Referring back to FIG. 2, by employing the computing device 50, data can be organized and visualized in a manner that enhances readability. Moreover, there is no limit to the number of layers of icosahedron data grids and/or partitions available on each of the icosahedron data grid. Thus, the mesh engine 60 can be employed to map nearly any data set onto a customized nested icosahedron data grid.

Figure 10:
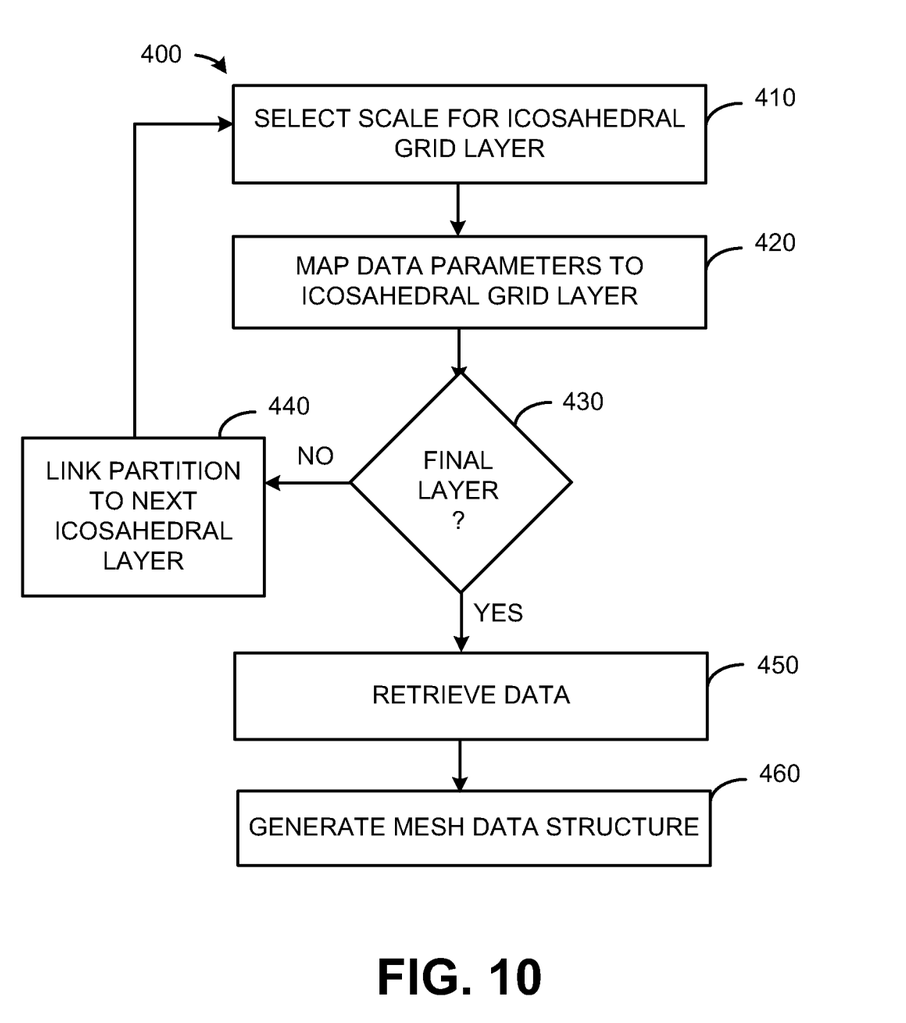
FIG. 10 illustrates a flowchart of an example method for generating a nested icosahedral grid.

In view of the foregoing structural and functional features described above, an example method will be better appreciated with reference to FIG. 10. While, for purposes of simplicity of explanation, the example method of FIG. 10 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 10 illustrates a flowchart of an example method 400 for generating a nested icosahedral grid. The method 400 can be implemented, for example by the system 2 of FIG. 1 and/or the computing device 50 of FIG. 2. At 410, a scale for an icosahedral grid layer of the nested icosahedral grid can be selected by mesh engine (e.g., the mesh engine 60 of FIG. 2). The scale may be constant over the entire outer layer icosahedral grid (e.g., as illustrated in FIGS. 3-5) or may varied throughout the outer layer of the icosahedral grid (e.g., as illustrated in FIG. 6). At 420, the mesh engine can map data parameters (data fields) from a data set (or multiple data sets) to partitions on the icosahedral grid layer.

At 430, a determination can be made by the mesh engine as to whether the current icosahedral layer is the final layer (e.g., the innermost or outermost layer). The determination could be based, for example, on user input to the mesh engine. If the determination at 430 is negative (e.g., NO), the method can proceed to 440. If the determination at 430 is positive (e.g., YES), the method can proceed to 450. At 440, the mesh engine can link a partition of the current icosahedral layer to a next icosahedral layer, and the method can return to 410.

At 450, the mesh engine can retrieve data items (data values) based on the parameters that have been mapped onto the nested icosahedral grid from the data set (or multiple data sets). At 460, the mesh engine can generate a mesh data structure for the nested icosahedral grid. The mesh data structure can be viewed by a mesh data viewer (e.g., the mesh data viewer 76 of FIG. 2).

As noted, the nested icosahedral grid can represent nearly any data set. For instance, the method 400 could be employed for example, to generate the nested icosahedral grid to represent a topology of a network. In such a situation, the nested icosahedral grid could represent a computer network, a social network, a road network, a commerce network, a referral network, etc. (each which may simply be referred to as a network). The network could be a relatively complex network, such as a portion of the Internet (e.g., a subnet, a segment of a subnet, etc.). The data set characterizing the network could be represented as a table (or multiple tables) that include data representing a number of nodes, edges and/or vertices in the network.

The information in the data set could be employed, for example at 410 (of the method 400) to select a scale of the icosahedral grid layer. For instance, the data set characterizing the network could be employed to facilitate understanding of a number of triangles needed in the icosahedral grid layer to adequately characterize the network. Upon generating the nested icosahedral grid (examples illustrated in FIGS. 3-9), geometric pattern analysis can be employed to analyze characteristics of the network. Such geometric pattern analysis could be used, for example, to determine/predict flow of data/information/commerce (depending on a type of the network being represented). Accordingly, by employment of the method 400 on a data set representing a network, the computational burden and/or cognitive burden for analyzing the network can be reduced.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions, the machine executable instructions comprising:
a mesh engine that generates a nested icosahedral grid that maps data points of a plurality of data sets onto partitions on the nested icosahedral grid, wherein the nested icosahedral grid comprises:
an outer icosahedral grid with a first set of partitions, wherein the outer icosahedral grid represents a three-dimensional (3D) shape with an inner volume; and
an inner icosahedral grid, representing a 3D shape and being enveloped by the outer icosahedral grid and positioned within the inner volume of the outer icosahedral grid, the inner icosahedral grid having a second set of partitions different than the first set of partitions, wherein a first partition of the first set of partitions is linked to the inner icosahedral grid.

2. The medium of claim 1, wherein the inner icosahedral grid is a first inner icosahedral grid and the nested icosahedral grid further comprises a second inner icosahedral grid enveloped by the first inner icosahedral grid and the outer icosahedral grid, the second inner icosahedral grid having a third set of partitions, wherein a second partition of the first set of partitions of the outer icosahedral grid is linked to the second inner icosahedral grid.

3. The medium of claim 2, wherein the nested icosahedral grid further comprises a third inner icosahedral grid enveloped by the second inner icosahedral grid, the first inner icosahedral grid and the outer icosahedral grid, the third inner icosahedral grid having a fourth set of partitions, wherein a first partition of the third set of partitions of the second inner icosahedral grid is linked to the third inner icosahedral grid.

4. The medium of claim 1, wherein a given partition in the first set of partitions of the outer icosahedron grid and another partition in the second set of partitions of the inner icosahedron are each mapped to different time instances of a data point that that varies as a function of time.

5. The medium of claim 4, wherein at least two spherical triangles of the first set of partitions have different sizes.

6. The medium of claim 4, wherein each partition in the second set of partitions icosahedron is a spherical triangle, wherein there are a different number of partitions in the first set of partitions of the outer icosahedral grid and the second set of partitions in the inner icosahedral grid.

7. The medium of claim 4, wherein each partition in the second set of partitions of the inner icosahedral grid is a parallelogram.

8. The medium of claim 1, wherein the machine executable instructions further comprise a mesh data server that receives a request from a mesh data viewer for data associated with a given partition of the second set of partitions of the inner icosahedral grid.

9. The medium of claim 8, wherein the mesh data server provides a given data item associated with the given partition of the second set of partitions of the inner icosahedral grid and another data item associated with another partition of the first set of partitions of the outer icosahedral grid to the mesh data viewer in response to the request.

10. The medium of claim 1, wherein each partition in the first set of partitions of the outer icosahedron corresponds to a geolocation on the earth.

11. A non-transitory machine readable medium having machine executable instructions, the machine executable instructions comprising:
a mesh engine comprising:
a grid generator that generates a nested icosahedral grid;
an interface that provides user controls for mapping parameters from a data set to partitions in the nested icosahedral grid; and
a model generator that links data items from the data set corresponding to the mapped parameters to the partitions of the nested icosahedron and generates a mesh data structure;
wherein the nested icosahedral grid comprises:
an outer icosahedral grid with a first set of partitions, wherein the outer icosahedral grid represents a three-dimensional (3D) shape with an inner volume; and
an inner icosahedral grid, representing a 3D shape and being enveloped by the outer icosahedral grid and positioned within the inner volume of the outer icosahedral grid, the inner icosahedral grid having a second set of partitions different than the first set of partitions, wherein a first partition of the first set of partitions is linked to the inner icosahedral grid.

12. The medium of claim 11, wherein the machine executable instructions further comprise a mesh data server that receives a request from a mesh data viewer for data associated with a given partition of the second set of partitions of the inner icosahedral grid.

13. The medium of claim 12, wherein the mesh data server provides a data item associated with the given partition of the inner icosahedral grid and an associated partition of the first set of partitions of the outer icosahedral grid to the mesh data viewer in response to the request.

14. The medium of claim 12, wherein the mesh data server executes a wavelet function to identify the data items provided to the mesh data viewer.

15. The medium of claim 11, wherein the outer icosahedral grid has a different number of partitions than the inner icosahedral grid.

16. The medium of claim 11, wherein the model generator applies coloring to the partitions of nested icosahedral grid that represent data values from the data set.

17. A non-transitory machine readable memory for storing machine readable instructions, the machine readable instructions comprising:
a mesh data viewer that communicates with a mesh data server to access a mesh data structure that links a nested icosahedral grid to data points and provides a graphical user interface (GUI) for changing views of the nested icosahedral grid;
wherein the icosahedral grid comprises:
an outer icosahedral grid with a first set of partitions, wherein the outer icosahedral grid represents a three-dimensional (3D) shape with an inner volume; and
an inner icosahedral grid, representing a 3D shape and being enveloped by the outer icosahedral grid and positioned within the inner volume of the outer icosahedral grid, the inner icosahedral grid having a second set of partitions different than the first set of partitions, wherein a first partition of the first set of partitions is linked to the inner icosahedral grid.

18. The medium of claim 17, wherein the GUI of the mesh data viewer provides user controls for controlling the translucency of the outer icosahedral grid.

19. The medium of claim 17, wherein the GUI of the mesh data viewer provides a cross-sectional view of the nested icosahedral grid that illustrates a portion of the outer icosahedral grid and the icosahedral grid concurrently.

20. The medium of claim 17, wherein the GUI of the mesh data viewer provides a data panel that outputs data associated with a first selected partition of the second set of partitions of the inner icosahedron and a second selected partition of the first set of partitions.

* * * * *